United States Patent
Kringel et al.

(10) Patent No.: US 6,789,775 B2
(45) Date of Patent: Sep. 14, 2004

(54) FLEXIBLE CONNECTION SYSTEM FOR A MOUNTING DEVICE

(75) Inventors: George Kringel, Westport, CT (US); Frank Calderazzo, Englewood, FL (US)

(73) Assignee: News America, Inc., Wilton, CT (US)

( * ) Notice: Subject to any disclaimer, the term of this patent is extended or adjusted under 35 U.S.C. 154(b) by 0 days.

(21) Appl. No.: 10/233,148

(22) Filed: Aug. 28, 2002

(65) Prior Publication Data

US 2004/0041072 A1 Mar. 4, 2004

(51) Int. Cl.$^7$ ............................................. F16M 13/00
(52) U.S. Cl. ................................. 248/584; 40/661.03
(58) Field of Search ........................ 248/584, 220.21, 248/220.22, 222.11, 224.51, 299.1, 292.14, 918; 40/642.02, 651, 661.03; 211/94.01

(56) References Cited

U.S. PATENT DOCUMENTS

| 834,553 | A |   | 10/1906 | Bartlett | |
|---|---|---|---|---|---|
| 2,652,221 | A |   | 9/1953 | Kampa | 248/278 |
| 2,840,332 | A | * | 6/1958 | Naum | 248/124.1 |
| 3,538,863 | A |   | 11/1970 | Howard et al. | 108/94 |
| 4,516,751 | A |   | 5/1985 | Westbrook | 248/276 |
| 4,645,155 | A |   | 2/1987 | Eldon et al. | 248/278 |
| 4,708,312 | A |   | 11/1987 | Rohr | 248/280.1 |
| 4,798,013 | A |   | 1/1989 | Sainato | 40/651 |
| 4,805,331 | A |   | 2/1989 | Boggess et al. | 40/651 |
| 4,881,707 | A | * | 11/1989 | Garfinkle | 248/222.12 |
| 4,909,464 | A | * | 3/1990 | Levine et al. | 248/220.22 |
| 5,289,652 | A |   | 3/1994 | Kringel et al. | 40/642 |
| 5,297,768 | A |   | 3/1994 | Denton | 248/442.2 |
| 5,553,820 | A |   | 9/1996 | Karten et al. | 248/286.1 |
| 5,671,851 | A |   | 9/1997 | Johnson et al. | 211/51 |
| 6,007,036 | A |   | 12/1999 | Rosen | 248/286 |
| 6,012,244 | A |   | 1/2000 | Begum et al. | 40/661 |
| 6,012,693 | A |   | 1/2000 | Voeller et al. | 248/280 |
| 6,168,126 | B1 |   | 1/2001 | Stafford | 248/276 |
| 6,179,263 | B1 |   | 1/2001 | Rosen | 248/278 |
| 6,202,334 | B1 | * | 3/2001 | Reynolds et al. | 40/642.02 |
| 6,209,835 | B1 |   | 4/2001 | Walrath et al. | 248/276 |
| 6,315,134 | B1 |   | 11/2001 | Stuart | 211/87 |
| 6,315,259 | B1 |   | 11/2001 | Kolb | 248/276 |
| 6,438,882 | B1 | * | 8/2002 | Reynolds | 40/642.02 |
| 6,547,191 | B2 | * | 4/2003 | McDonald | 248/49 |
| 2002/0059743 | A1 | * | 5/2002 | Reynolds | 40/642.02 |
| 2002/0130223 | A1 | * | 9/2002 | McDonald | 248/49 |

* cited by examiner

*Primary Examiner*—Leslie A. Braun
*Assistant Examiner*—Kofi Schulterbrandt
(74) *Attorney, Agent, or Firm*—Sofer & Haroun, LLP

(57) ABSTRACT

The present invention is directed to a mounting device comprised of a base configured for attachment to a desired mounting surface and to secure a resilient connector extending away from a connector support. The resilient connector further comprising a flexible snubber and a spring surrounding the snubber. At least two alignment surfaces are provided, disposed around the resilient connector, where the alignment surfaces adjoining each other. The alignment surfaces may be disposed on an alignment loop, or a plurality thereof, disposed around the resilient connector.

27 Claims, 7 Drawing Sheets

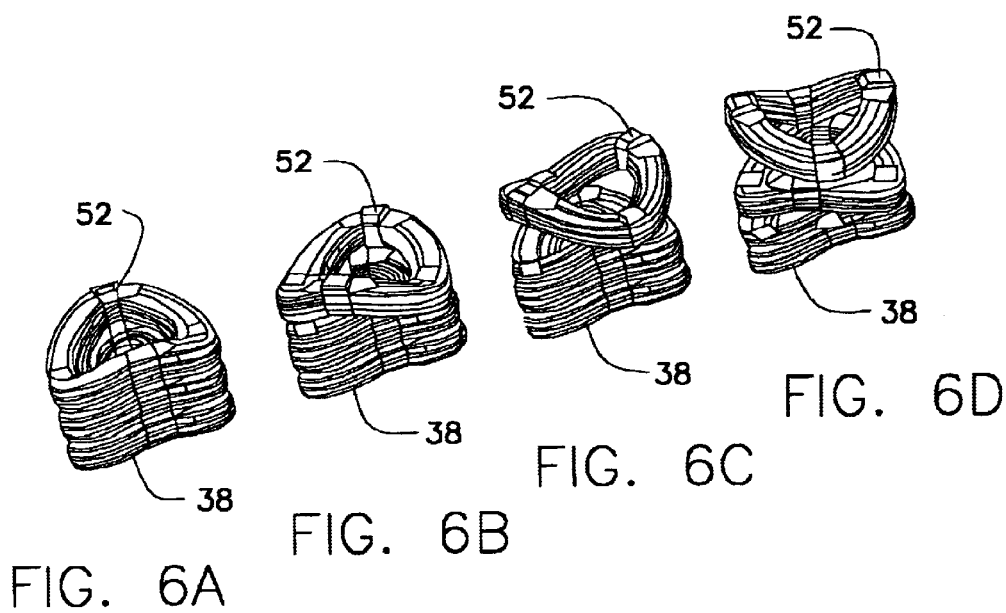

FLEXIBLE CONNECTION SYSTEM FOR A MOUNTING DEVICE

FIELD OF THE INVENTION

The present invention relates to a flexible mounting device and, in particular a mounting device, which will allow a large variety of objects to be affixed to a various mounting locations, in a predetermined physical orientation.

BACKGROUND OF THE INVENTION

Certain mounting devices for attaching objects to fixed locations are well known. Mounting devices are available in the form of clamps, brackets, fittings, etc. Many mounting devices that have been used previously, however, are not suitable for mounting objects in locations which are physically abusive. One example of use of such mounting devices is for display advertising and promotional material, or other objects located in supermarkets and other retail establishments.

On exemplary location for using such mounting devices is the shelves in grocery and other retail stores. The shelves typically have a channel attached to their distal edge. These channels are generally referred to as "price channels." Price channels are typically formed of extruded metal sections, such as an extruded aluminum section. Price channels are adapted to accept cards that display price, weight, or other product information. They have also been used to mount promotional materials.

Mounting devices that have been used prior to the present invention typically orient the materials being displayed in a plane parallel to the price channel and, consequently, parallel to the edge of the shelf.

Most mounting devices which are intended to hold an attached object in a very specific orientation in space hold them in a rigid fashion. When an overwhelming force is able to displace the attached object, damage usually results to the object and/or the attachment mechanism. Such devices are disclosed, for example, by Made, in U.S. Pat. No. 3,313,054 for Display Devices (Jun. 9, 1965); Krautsack, U.S. Pat. No. 4,016,977 for Assemblage With Dual Support (Apr. 12, 1977); Bernie, U.S. Pat. No. 4,420,082 for Tab Mounted Dispenser (Dec. 13, 1983); and Langwell, U.S. Pat. No. 4,572,380 for Pad Holder Adapted for Multiple Modes of Mounting and Associated Methods (Feb. 25, 1986). Each of these patents discloses a mounting device that is inserted into the price channel, without providing adequate visibility for the displayed item.

It is desirable to orient the advertising promotional materials or other display items in such a fashion that they extend away from their support plane so as to provide visibility and attract more attention. In that orientation, the display can be seen by the consumer even from a far distance. Mounted in this way, however, the displayed item is much more likely be accidentally or intentionally hit, bumped, on dislodged.

Certain mounting devices known prior to the present invention are unable to withstand rough usage to which a mounting device may be subject to in it's environment, for example in a supermarket or other consumer establishment. In-store promotional programs may require that the mounting device remain in place in a store for periods of months at a time, or longer. During that period, the display material and mounting device may be repeatedly bumped and manipulated. Unless the mounting device is resilient and durable, it may not be able to withstand even accidental abuse and remain in place on the shelf for the full duration of the promotional program.

Many mounting devices that have been used prior to the present invention do not provide a firm and secure mounting. Display devices that have been used prior to the present invention in grocery stores typically are not firmly anchored into the price channel. Many such mounting devices are simply inserted into the price channel or are held in place with relatively little force, such as by the resiliency of the material of which the mounting device is constructed, or simply by the force of gravity. Such devices may be easily dislodged from the price channel or can be intentionally removed from the price channel with relatively little force. Items which are flexibly mounted frequently will simply move under the force of externally applied pressure and become separated from the mounting location.

Further, mounting devices mounted on the distal edges of grocery or other retail store shelves are readily accessible and are frequently subject to vandalism or intentional abuse. It is not uncommon for children, or others, to pull on the advertising display or to hang from it, thereby, placing substantial force on the attachment point. In addition, persons having access to the display may mutilate it or its mounting. Many mounting devices that have been used prior to the present invention cannot withstand such abuse.

As such, it is desirable that mounting devices mounted in various areas of a supermarket or other retail establishment that maintain a sturdy but flexible connection between the mounting device support base and the item that is attached and extended away from the base. If the connection is too flexible, it will not be able to support weighty objects attached thereto and will be easily subject to damage from minimal contact. If the connection is overly rigid it could cause permanent breakage to occur in the face of overwhelming force.

Accordingly, there is a need for an easy to use mounting device, that will provide a means for attaching to many locations a large variety of items, that is attractive, inexpensive, easy to install, detachable, and provides a sound and compact attachment. Moreover, such a device must be resilient and must be able to withstand rough usage, including bumping and vandalism or tampering. Prior art approaches do not adequately address the problem of providing such a mounting device.

OBJECTS OF THE INVENTION

One object of the present invention, therefore, is to provide a device for mounting a wide variety of items to a wide variety of mounting locations in a flexible manner that minimizes physical damage to the attached device when it is subjected to overwhelming displacement forces.

A further object of the present invention is to provide means to return the mounted items to their original intended mounting orientation after application of an overwhelming dislocation force applied to the mounted item.

A further object of the present invention is to provide an inexpensive mounting device, which is easy to install.

An additional object of the present invention is to provide a mounting device that is detachable and reusable.

Another object of the present invention is to provide a durable, resilient, and easily maintained mounting device that will withstand severe usage conditions and accidental or intentional abuse.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

SUMMARY OF THE INVENTION

The present invention is directed to a mounting device comprised of an attachment plate configured for attachment to a desired mounting surface and to secure a resilient connector extending away from the attachment plate. The resilient connector further comprises a flexible snubber and a spring surrounding the snubber.

Alignment surfaces or surfaces on alignment loops are provided having alignment surfaces adjoining each other, each pair of adjoining alignment surfaces has at least one rotation retarder, so as to prevent rotational movement of the alignment loop surfaces beyond a specifiable angle of rotation.

BRIEF DESCRIPTION OF THE DRAWINGS

FIGS. 6a–6d illustrate the movement of alignment loops in accordance with one embodiment of the present invention.

DETAILED DESCRIPTION

The accompanying drawings, which are incorporated herein by reference and constitute a part of this specification, illustrate one embodiment of the invention, and together with the description, serve to explain the principles of the invention.

In accordance with on embodiment of the invention, advertising display mounting device 10 has a mounting base 12 configured to cooperate with a mounting location such as a price channel on a shelf in a grocery or other retail store to hold an advertisement or promotional object firmly and resiliently in place on the mounting location such as the shelf. The shelf, in a typical grocery store or other retail store, has a price channel disposed along its distal edge. The price channel is adapted to hold cards providing pricing or other product information and is adapted to receive various types of mounting hardware. In one example of the invention, base 12 of device 10 is configured to lock device 10 into place along the price channel at the desired location.

Mounting base 12 can be attached to the price channel in any number of ways. An exemplary method of attachment can be found in U.S. Pat. No. 5,289,652 issued to Kringel, the entirety of which is incorporated herein by reference. For the purposes of illustration, the attachment method of base 12 to its mounting location such as the price channel operates in a manner similar to the system and method described in the '652 patent, however this is in no way intended to limit the scope of the present invention. Any method of attachment of base 12 to any mounting location is within the contemplation of the present invention.

Figure 1A:
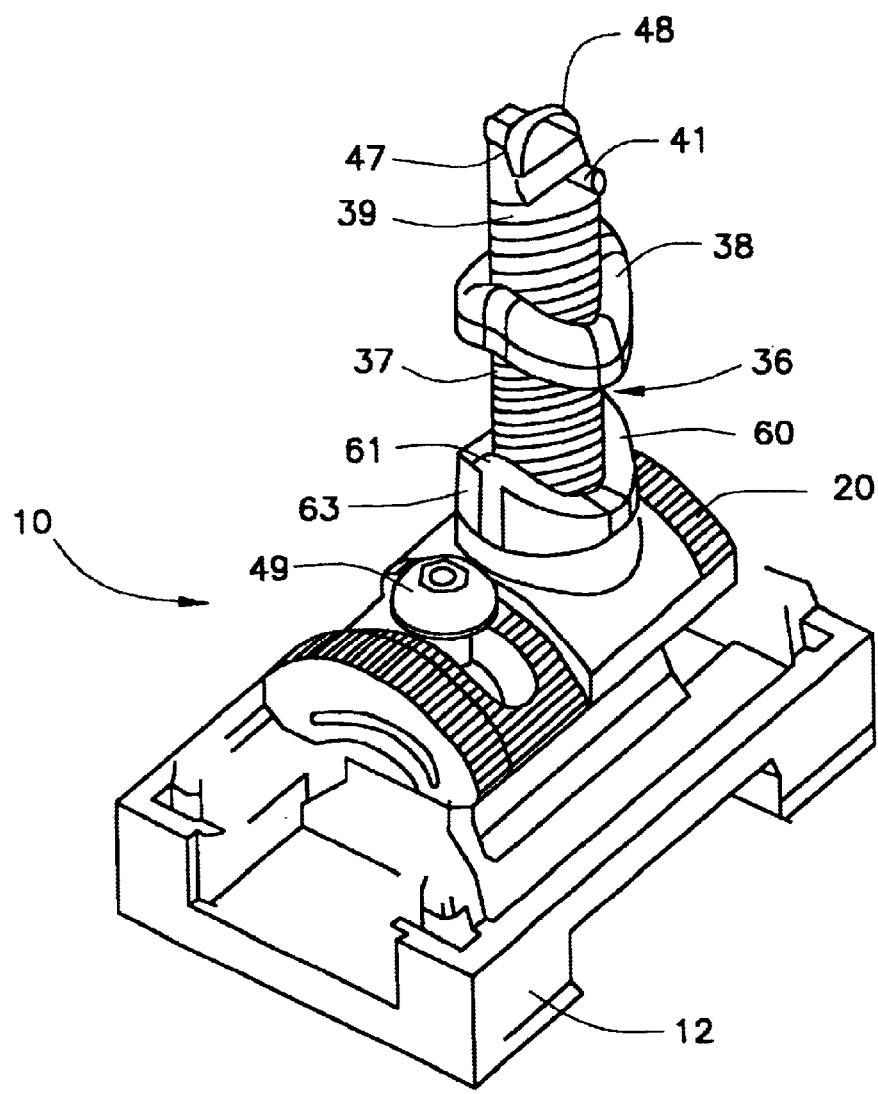
FIGS. 1a–1b illustrate a perspective view of a mounting device, according to one embodiment of the present invention.
Figure 4:
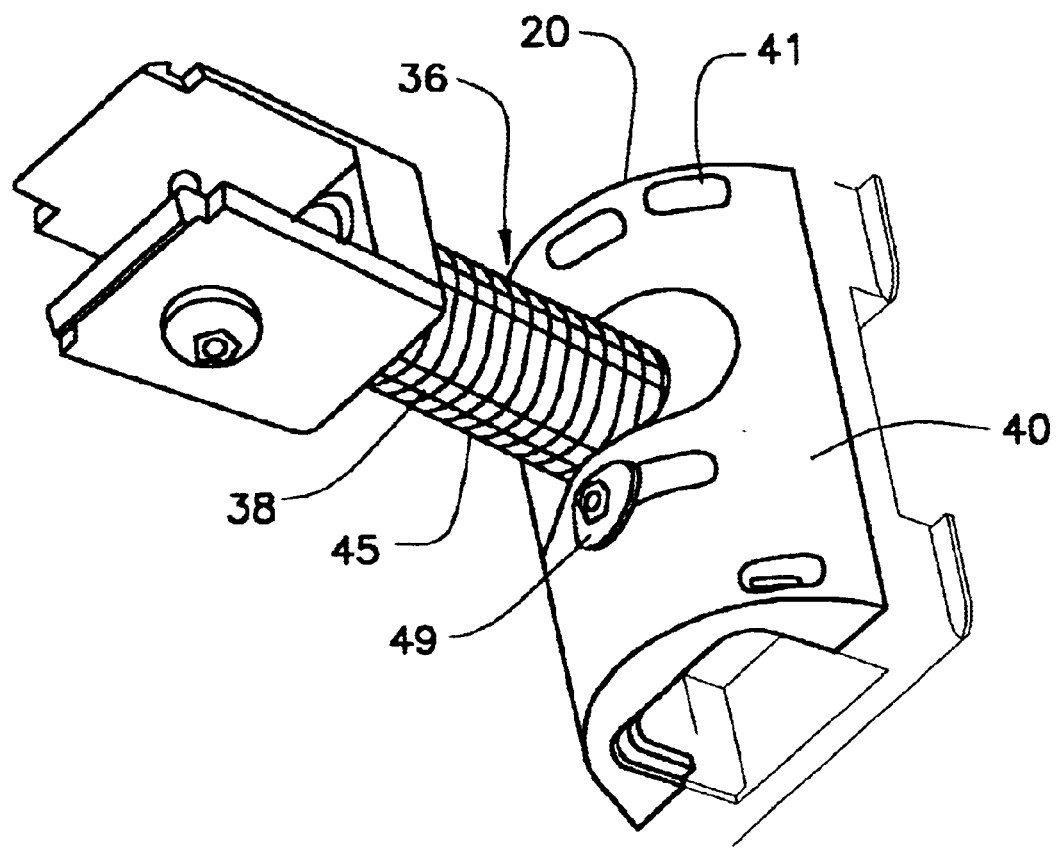
FIG. 4 is perspective view of an advertisement clip and a mounting device as seen in FIGS. 1 and 3, in accordance with one embodiment of the present invention.

In one embodiment of the invention, as illustrated in FIGS. 1 and 4, mounting base 12 maintains an connector support 20 such as an attachment plate 20, resilient connector 36, an auxiliary mounting aid 40, such as a lock plate 40, and a fastener 49. As illustrated in FIG. 1, attachment plate 20 connects to base 12 and is locked into position by fastener 49. Resilient connector 36 extends away from an attachment socket 21, located in the rear of attachment plate 20, in a direction away from base 12. Socket 21, prevents resilient connector 36 from being pulled from connector support 20 in a direction away from base 12. As illustrated in FIG. 4, lock plate 40, has an opening 41 that fits over attachment plate 20 allowing resilient connector 36 to extend therethrough and to be oriented over wide arc relative to base 12. As such, attachment plate 20 can be secured by fastener 49, or any other expedient means to base 12 or any other of a variety of mounting surfaces.

Attachment plate 20, does not require the use of auxiliary mounting aid 40 to operate. In fact, any connector support 20, such as the attachment plate 20 provided may simply be directly coupled to base 12, or even directly to the desired mounting location. Auxiliary mounting aide 40 merely provides mounting device 10 with the ability to attach resilient connector at various angles relative to base 12, and with the ability to quickly change that orientation.

It should be noted that attachment plate 20 is used an exemplary form of connector support 20 through out this application as illustrative of one type of connector support, however, this is in no way intended to limit the scope of the present invention. Any connector support 20, such as a hinge, plate or latch capable of supporting resilient connector 36 is within the contemplation of the present invention.

It should also be noted that lock plate 40 is used an exemplary form of auxiliary mounting aid 40 through out this application as illustrative of one type of mounting aid, however, this is in no way intended to limit the scope of the present invention. Any auxiliary mounting aid 40, such as a plate, clip or clasp capable of retaining connector support 20 is within the contemplation of the present invention.

In one embodiment of the present invention, attachment plate 20 is slidingly positioned along a range of angles relative to base 12 so that resilient connector 36 can be positioned at desired angles relative to base 12 allowing the advertisement to be displayed accordingly. Once lock plate 40 is positioned properly over attachment plate 20 against base 12, fastener means 49, accessible through an opening in lock pate 40, is engaged to lock attachment portion 20 into position.

In one embodiment of the present invention, as illustrated in FIG. 1, resilient connector 36, comprises a spring 37 coiled around a snubber 39, and a stacked set of alignment loops 38, such as wave-shaped washers 38. As embodied herein, spring 37 is preferably constructed out of music wire, or other suitable material having similar properties, that are adjustable over a broad range depending on the weight and size of the objects that are attached to the mounting device.

It should be noted that wave-shaped washers 38 are used through out this application as an exemplary of alignment loops 38, however this is in no way intended to limit the scope of the present invention. Any similarly functioning elements used as alignment loops are within the contemplation of the present invention.

Snubber 39 is preferably constructed of a lightweight rubber or polyurethane material of selectable diameter, which extends from attachment means 20 through the inside of the coil of spring 37. In a preferred embodiment of the present invention, a plurality of wave-shaped washers 38 form a spring sheath 45. Washers 38 are advantageously constructed out of polycarbonate plastic material or other suitable material having similar elastic properties.

Figure 1B:
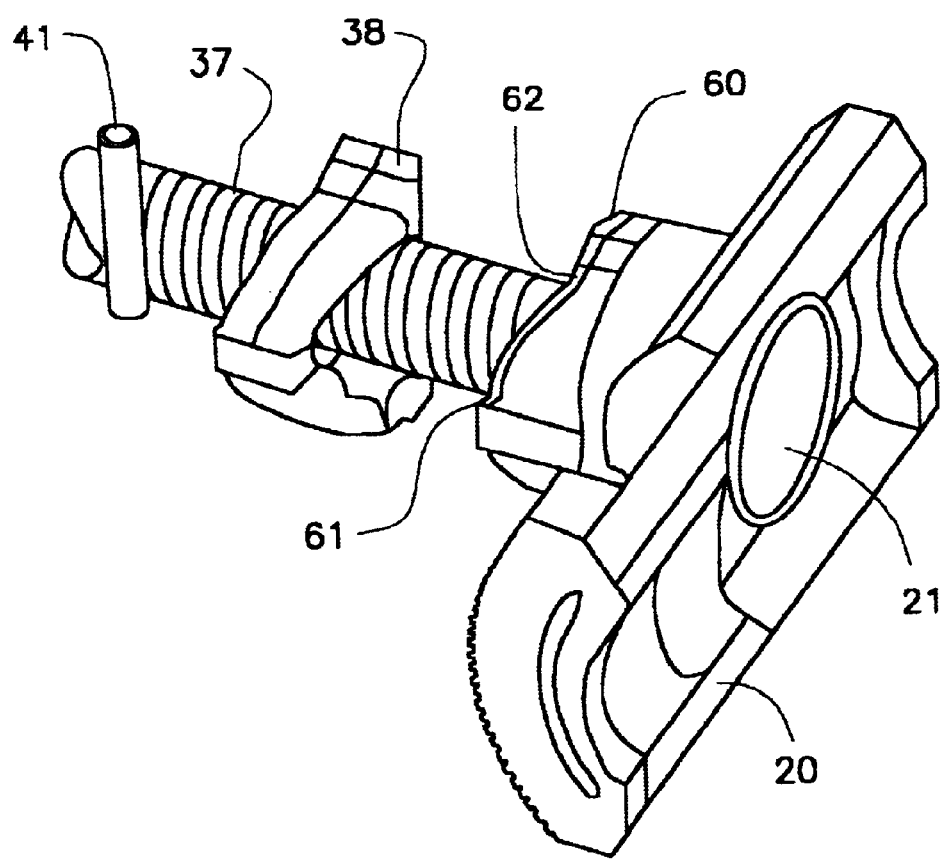

FIG. 1b illustrates a bottom view of mounting device 10, specifically the arrangement of attachment plate 20 and socket 21 in accordance with one embodiment of the invention. Socket 21 may be a directly molded into attachment plate 20 and is of a geometric configuration and diameter such that both the enlarged base portions of snubber 39 and of spring 37 can not fit through. In this configuration, resilient connector 36 is secured to attachment plate 20 in such a way that it can not be pulled from attachment plate 20 in a direction away from base 12 as described above.

It will be apparent to those skilled in the art that various modifications and variations can be made in the construction of resilient connector 36 and spring 37, without departing from the scope or spirit of the invention. For example, resilient connector 36, in accordance with another embodiment of the invention, comprises various types of springs, cordage, tubing, or other suitable resilient attachment means or combinations thereof. Spring 37 could comprise any of a variety of elastic materials such a rubber or elastic cord or other suitable materials. Hence, it is intended that the present invention cover the modifications and variations of the invention, so as to achieve their intended result.

Snubber 39 extends outwardly from attachment plate 20 through and out the distal end of spring 37 where it ends in an attachment head 47 further maintaining an opening through which a locking rod 41 is inserted. Spring 37, which is coiled around snubber 39, maintains a catch coil 48 which extends around attachment head 47 so as to require the spring and the snubber to extend as an assembly.

As embodied herein, snubber 39 serves to help limit the degree of extension of spring 37 in order to prevent inelastic deformation of spring 37 in the event display device 10 of the present invention is subject to undue stress, rough handling, or abuse.

In one embodiment of the present invention, as illustrated in FIGS. 1 and 4, spring sheath 45 comprises a series of wave washers 38 constructed of a durable polycarbonate polymer or other similar material. It should be noted that the durable polycarbonate composition of wave-shaped washers 38 is intended only as an example of one possible composition. Any similar device which utilizes similar wave washers regardless of there composition is within the contemplation of the present invention.

Figure 2:
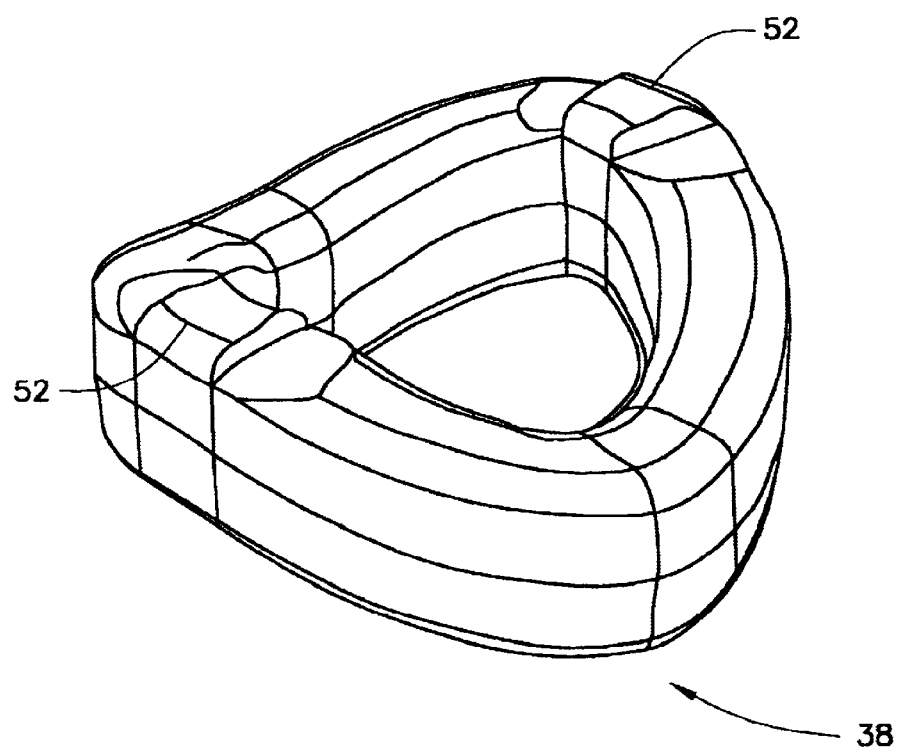
FIG. 2 is a perspective view of an alignment loop as seen in FIG. 1, in accordance with one embodiment of the present invention.

In one embodiment of the present invention, as illustrated in FIG. 2, wave-shaped washers 38 each maintain at least two crest regions 50 and two trough regions 51. Whenever the assembly is forcibly displaced the crest and the trough regions serve to cause the assembly to always attempt to radially re-align itself around the spring and snubber's longitudinal axis. Rotation retarder notches 52 are disposed at the top of each crest region 50. Notch 52 is configured to be of a size and shape such that when wave washers 38 are placed adjacent to one another, and their contours are aligned, the notch profiles do not exceed the profile boundaries established by the crest and trough contours.

In one embodiment of the present invention, as illustrated in FIGS. 1 and 4, attachment plate 20 maintains a wave mount portion 60, which is formed flush with the surface of attachment plate 20. The region of wave mount portion 60, distal to base 12 maintains a similar formation of that of wave-shaped washers 28. A crest region 61 and trough region 62 are formed with a rotation retarder notch 63, disposed at the top of crest region 61, maintaining structural similarities and contours with wave washers 38.

In one embodiment of the present invention, as illustrated in FIG. 4, resilient connector 36 is formed by placing snubber 39 into spring 37 until attachment head 47 of snubber 39 is firmly held within catch coil 48 of spring 37. Spring 37 and snubber 39 are then inserted through the rear of attachment plate 20 such that they protrude from the top opening of wave mount portion 60. Wave washers 38 are then placed around resilient connector means 36, where the first wave washer 38 is placed adjacent to wave mount region 60 of attachment means 20. Wave washers 38 are added until the entire exposed spring 37/snubber 39 of resilient connector means 36 is covered except for the exposed attachment head 47. In this configuration wave-shaped washers 38 and wave mount portion 60 form together to provide a continuous smooth polyurethane spring sheath 45 for spring 37/snubber 39 arrangement.

Figure 3:
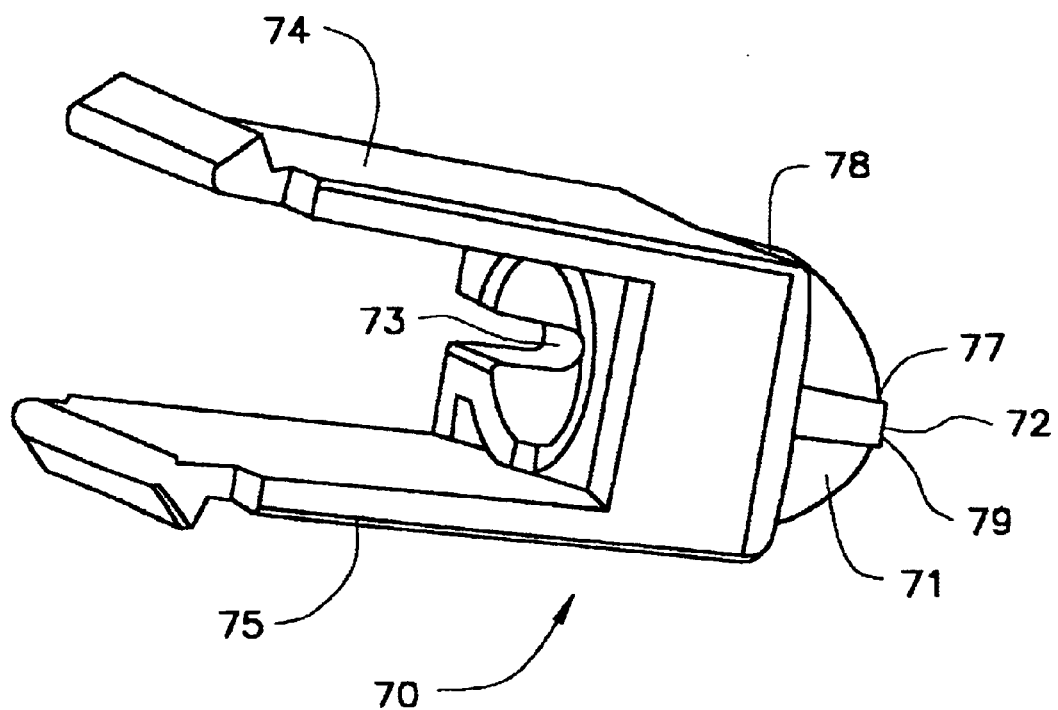
FIG. 3 is a perspective view of an advertising clip, in accordance with one embodiment of the present invention.

In one embodiment of the present invention, as illustrated in FIG. 3, an attachment 70, such as clip 70, is configured to be mounted on the end of resilient connector means 36. Advertisement clip 70 is comprised of a wave mount base region 71, a snubber opening 72, a pin holder 73 and first and second advertisement mounting arms 74 and 75.

It should be noted that clip 70 is used an exemplary form of advertisement mount 70 through out this application as illustrative of one type of advertisement mount, however, this is in no way intended to limit the scope of the present invention. Any advertisement mount 70, such as a hinge, latch, knuckle coupler or magnet, capable of supporting the advertisement is within the contemplation of the present invention.

Similar to wave mount portion 60 of attachment means 20, the region of wave mount base region 71 of advertisement clip 70 proximal to base 12 maintains a similar formation of that of wave-shaped washers 38. A crest region 77 and trough region 78 are formed with a rotation retarder notch 79 disposed at the top of crest region 77, maintaining structural similarities and contours with wave-shaped washers 38.

In one embodiment of the present invention, as illustrated in FIG. 4, the exposed attachment head 47 of snubber 39 of resilient connector means 36 is inserted through snubber opening 72 until the matching contours of crest region 77 and trough region 78 of wave mount base region 71 snuggly fit, adjacent to the last wave-shaped washer 38 disposed at the end of resilient connector means 36. Locking rod 41, illustrated in FIG. 1, is placed inside pin holder 73 and through an opening in attachment head 47 such that advertisement clip 70 is firmly attached to resilient connector means 36.

In this configuration of the fully assembled device 10, as illustrated FIG. 4, base 12 maintains attachment plate 20 locked into place by fastener 49 and lock plate 40. Extending from attachment portion 20, completely assembled resilient connector 36 is comprised of snubber 39, covered by spring 37 and shrouded by spring sheath 45, formed from wave washers 38, extends from attachment mean 20 to an advertisement clip 70. This configuration provides for a sturdy but flexible connection between a base 12 coupled to the mounting location such as the price channel and advertising clip 70, which is configured to support advertising material of some kind.

Figure 5:
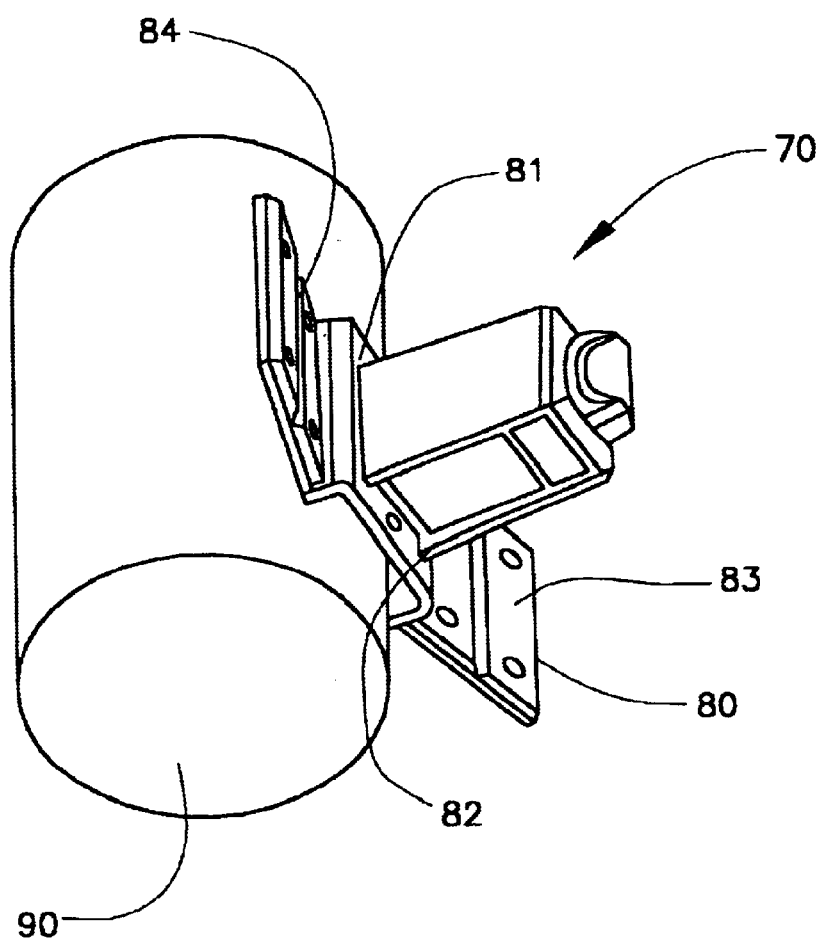
FIG. 5 is a perspective view of an advertisement support bracket and an advertisement clip, as seen in FIG. 4, in accordance with one embodiment of the present invention.

In one embodiment of the present invention, as illustrated in FIG. 5, a product adapter 80, such as bracket 80, is configured to be mounted on the end of advertisement clip 70. Advertisement support bracket 80 maintains first and second clip locks 81 and 82 configured to receive advertisement mounting arms 74 and 75. As illustrated in FIG. 5, advertisement support 80 further maintains first and second mounting wings 83 and 84 for attaching an advertisement display item 90 to bracket 80.

It should be noted that advertisement support bracket 80 is used an exemplary form of product adaptor 80 through out this application as illustrative of one type of product adaptor, however, this is in no way intended to limit the scope of the present invention. Any product adaptor, such as a hinge, clip or latch capable of supporting advertisement display item 90 is within the contemplation of the present invention.

In one embodiment of the present invention not only advertising display device 10 is configured to provide a sturdy flexible mount for advertising display item 90 capable of protecting against standard bumping and accidental collisions, but spring sheath 45, also protects spring 37/snubber 39 from over rotation problems associated with intentional twisting.

As with any spring-mounted arrangement, spring 37 is capable of stabling item 90 while also allowing for vertical and horizontal movement. However, particularly damaging to spring mount systems, twisting of the spring usually causes irreparable harm to its resiliency. To this end, as illustrated in FIGS. 6a–6d, washers 38 operate to prevent the spring to rotate beyond a specified point of compression as described below in more detail.

As mentioned earlier in one example of use of the present invention, mounting device 10 is installed on mounting location such as a shelf. In rare occasions, mounting device 10 and item 90 may be subjected to extreme rotational movement, when someone attempts to rotate item 90 by force in a direction to stretch the spring assembly.

However, in these situations, wave-shaped washers 38 operate to prevent the rotational and axial movement of spring 37 beyond a certain point of compression. To this end, as illustrated in FIGS. 6a–6d, when a rotational force is exerted on item 90 and thus on spring 37, at least one of wave-shaped washers 38 begins to rotate along the surface of an adjacent washer. Since each washer is wave-shaped, during the rotation, rotation retarder notch 52 is the point of contact along the surface of the adjoining washer. As such, notches 52 of the first washer begin their movement from the corresponding trough regions 51 of a second adjacent washer and travel along the surface of the adjacent washer towards the corresponding crest region 50 of the adjacent washer, until each rotation retarder notch 52 of the first washer engages against the corresponding rotation retarder notch 52 of the adjacent washer. At this point the first washer stops to rotate.

If however, the imposed rotational angle exceeds the free limit of the crest trough relationship then the action migrates to the next lowest frictionally coupled surface junctures, such that a third washer begins its movement, along an adjacent washer as described before. As such, as illustrated in FIGS. 6c and 6d, the force exerted on the first two washers, is transferred to the third washer, ad infinitum. It is noted that notches 63 of wave shaped mount portion 60 and notches 79 of wave mount base region 71 engage the corresponding notches of their adjacent washers in the same manner explained before. This transfer of force to the next washer continues until slip notches 52, 63 and 79 have been engaged against an adjacent corresponding rotation retarder notch. At that point the blocking force created by all the engaged notches prevent any further axial movement regardless of a substantial axial force exerted on mounting device 10.

It is noted that the invention is not limited to a wave-shaped washer. For example, as mentioned before, any set of alignment loops having adjoining alignment surfaces with rotation retarding notches disposed on the front and back surfaces of each loop operate as explained above to prevent the movement beyond the point where all slip notches have been engaged against each other.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A mounting device comprising:
   a base configured for attachment to a desired mounting surface and to secure a resilient connector extending away from a connector support, said resilient connector further comprising a flexible snubber and a spring surrounding said snubber; and
   at least two alignment surfaces, disposed around said resilient connector, each of said alignment surfaces defined by wave shape washers having crest regions and trough regions, where said alignment surfaces are adjoining each other during the relative rotational movement of said resilient connector and wherein said alignment surfaces are biased to reorient said resilient connector to its original rotational alignment after rotational movement occurs.

2. The mounting device as claimed in claim 1, further comprising an attachment configured to adapt said resilient connector to the desired item being mounted.

3. The mounting device as claimed in claim 2, wherein said attachment is any one of an advertisement clip, a product sample clip and a work piece clip.

4. The mounting device as claimed in claim 1, further comprising rotation retarding notches disposed at the top of said crest regions and at the bottom of said trough regions configured to provide an arrangement for preventing movement of said wave shape washers beyond a specifiable point of rotation.

5. The mounting device as claimed in claim 1, wherein movement of said wave shape washers is a result of externally applied forces to said mounting device.

6. The mounting device as claimed in claim 1, wherein said connector support is an attachment plate configured to support said resilient connector in any predetermined orientation to said base of said mounting device.

7. The mounting device as claimed in claim 4, wherein said attachment plate further comprising a mount portion, configured to support and align against the first said alignment surface on said resilient connector.

8. The mounting device as claimed in claim 1, further comprising a locking pin mounted through said resilient connector at the end distal to the base of said mounting device, configured to support and maintain compressive forces on the wave shape washers on said resilient connector.

9. A mounting device comprising:
   a base configured for attachment to a desired mounting surface and said base securing a resilient connector extending away from a connector support, said resilient connector further comprising a flexible snubber and a spring surrounding said snubber; and a plurality of alignment loops each having an alignment surface adjoining each other, at least one pair of adjoining alignment surfaces, each having at least one retarder in contact with said adjoining alignment surface so as to prevent relative rotational movement of said adjoining alignment loops beyond a specifiable point of rotation.

10. The mounting device as claimed in claim 9, further comprising an attachment configured to adapt said resilient connector to the desired item being mounted.

11. The mounting device as claimed in claim 10, wherein said attachment is an advertisement clip.

12. The mounting device as claimed in claim 9, wherein said alignment loops further comprise crest regions and trough regions, such that said alignment devices are in the form of wave-shaped washers.

13. The mounting device as claimed in claim 12, further comprising rotation retarding notches disposed at the top of said crest regions and at the bottom of said trough regions configured to provide the means for said prevention of movement of said alignment loops beyond a specifiable point of rotation.

14. The mounting device as claimed in claim 9, wherein said movement of said alignment loops is a result of externally applied forces to said mounting device.

15. The mounting device as claimed in claim 9, wherein said connector support is an attachment plate configured support said resilient connector perpendicular to said base of said mounting device.

16. The mounting device as claimed in claim 15, wherein said attachment pate further comprising a mount portion, configured to support and align against the first said alignment loop on said resilient connector.

17. The mounting device as claimed in claim 9, further comprising a locking pin mounted through said resilient connector at the end distal to the base of said mounting device, configured to support and retain said alignment loops on said resilient connector.

18. An advertising display mounting device comprising:

a mounting base configured to attach to a shelf;

a connector support coupled to said mounting base;

a resilient connector extending away from an attachment plate, said resilient connector further comprising a flexible snubber and a spring surrounding said snubber; and a plurality of wave-washers inserted around said resilient connector, disposed in a first orientation relative to one another, said washers each having a front and back surface, such that in response to an axial force, at least one of said washers rotates to a second orientation against an adjacent washer until said at least one washer reaches a defined degree of rotation whereupon it returns to said first orientation.

19. The mounting device as claimed in claim 18, further comprising an attachment configured to adapt said resilient connector to the desired item being mounted.

20. The mounting device as claimed in claim 19, wherein said attachment is an advertisement clip.

21. The mounting device as claimed in claim 18, wherein said plurality of wave-washers, further comprise rotation retarding notches.

22. The mounting device claimed in claim 21, wherein said wave-washers further comprise crest regions and trough regions, such that said alignment devices are in the form of wave-shaped washers.

23. The mounting device as claimed in claim 22, wherein said rotation retarding notches are disposed at the top of said crest regions and at the bottom of said-trough regions.

24. The mounting device as claimed in claim 18, wherein said movement of said wave washers is a result of externally applied forces to said mounting device.

25. The mounting device as claimed in claim 18, wherein said connector support is an attachment plate configured to support said resilient connector perpendicular to said base of said mounting device.

26. The mounting device as claimed in claim 25, wherein said attachment pate further comprising a mount portion, configured to support and align against the first said wave washer on said resilient connector.

27. The mounting device as claimed in claim 18, further comprising a locking pin mounted through said resilient connector at the end distal to the base of said mounting device, configured to support and retain said wave washers on said resilient connector.

* * * * *